(12) United States Patent
Amirkhany (10) Patent No.: US 8,325,832 B2
(45) Date of Patent: Dec. 4, 2012

(54) ANALOG MULTI-TONE RECEIVER

(75) Inventor: Amir Amirkhany, Santa Clara, CA (US)

(73) Assignee: Rambus Inc., Sunnyvale, CA (US)

( * ) Notice: Subject to any disclaimer, the term of this patent is extended or adjusted under 35 U.S.C. 154(b) by 923 days.

(21) Appl. No.: 12/369,624

(22) Filed: Feb. 11, 2009

(65) Prior Publication Data

US 2009/0202004 A1  Aug. 13, 2009

Related U.S. Application Data

(60) Provisional application No. 61/027,800, filed on Feb. 11, 2008.

(51) Int. Cl.
*H04L 27/28* (2006.01)
*H04K 1/10* (2006.01)

(52) U.S. Cl. ....... 375/260; 375/316; 375/324; 375/340; 375/345

(58) Field of Classification Search ............... 375/260, 375/316, 324, 340, 345
See application file for complete search history.

(56) References Cited

U.S. PATENT DOCUMENTS

| | | | |
|---|---|---|---|
| 5,761,246 A * | 6/1998 | Cao et al. | 375/287 |
| 6,771,675 B1 * | 8/2004 | Cao et al. | 370/537 |
| 7,065,165 B2 * | 6/2006 | Heinonen et al. | 375/345 |

* cited by examiner

*Primary Examiner* — Ted Wang
(74) *Attorney, Agent, or Firm* — Morgan, Lewis & Bockius LLP (57) ABSTRACT

An analog multi-tone receiver includes an interface for receiving a data transmission signal containing N sub-channel signals corresponding to N active sub-channels. The receiver includes a plurality of samplers to sample, during each time interval of a sequence of time intervals, the received signal in parallel to produce a plurality of data sets, each sampler having a distinct threshold level. The receiver includes a decoder to jointly decode the plurality of data sets to determine a plurality of data symbols including at least one data symbol for each of the N active sub-channels.

22 Claims, 11 Drawing Sheets

ANALOG MULTI-TONE RECEIVER

RELATED APPLICATION

This application claims benefit of U.S. Provisional Application Ser. No. 61/027,800, filed Feb. 11, 2008, which is incorporated herein by reference in its entirety.

TECHNICAL FIELD

The present disclosure relates generally to the communication of data. More specifically, the present disclosure relates to the communication of data in an analog multi-tone system.

BACKGROUND

In analog multi-tone (AMT) systems, in order to minimize inter-symbol interference (ISI) or inter-channel interference (ICI), a Multi-Input Multi-Output (MIMO) Decision Feedback Equalizer (DFE) at the receiver may be used. The MIMO DFE operates at a sub-channel rate and mitigates any post-cursor ISI or inter-channel interference, typically by generating offset signals corresponding to respective sub-channel signals and providing the offset signals to the respective sub-channel signals. However, adding a DFE at the receiver increases the complexity of the AMT receiver, which may be undesirable in certain classes of applications, such as for memory interfaces. Therefore, some AMT receivers do not contain DFEs.

BRIEF DESCRIPTION OF THE DRAWINGS

Reference should be made to the following detailed description taken in conjunction with the accompanying drawings, in which.

Like reference numerals refer to corresponding parts throughout the drawings.

DETAILED DESCRIPTION OF EMBODIMENTS

An analog multi-tone (AMT) receiver circuit, for use in an AMT system, is described. In some embodiments, mixers and/or integrators are eliminated from the architecture of an AMT receiver circuit that does not have a Decision Feedback Equalizer (DFE). The receiver circuit includes an interface to receive a data transmission signal having N active or utilized sub-channel signals and containing N symbols. The receiver circuit includes multiple samplers to sample, during each time interval of a sequence of time intervals, the received signal in parallel to produce multiple data sets. Each sampler has a corresponding threshold level. In some embodiments, the threshold levels of the samplers are based on a priori knowledge of the "AMT trellis," as explained in more detail below. In addition, the threshold levels of the samplers may also be based on knowledge of the response of the communication channel (e.g., attenuation of the respective sub-channel signals) over which the data transmission signal is received. The receiver circuit includes a decoder to decode the data sets to determine a plurality of data symbols. The plurality of data symbols includes at least one data symbol for each of the N active sub-channels of the AMT system that are being utilized.

A method for receiving data in an AMT data communications system is described. The method includes receiving a data transmission signal containing N active sub-channel signals for N sub-channels. The received signal is compared, in parallel, with each of a plurality of distinct threshold levels to produce a corresponding plurality of comparison signals. During each time interval of a sequence of time intervals, the plurality of comparison signals is sampled to produce a plurality of data sets. The plurality of data sets is decoded to determine a plurality of data symbols including at least one data symbol for each of the N active sub-channels of the AMT system that are being utilized.

An embodiment of an AMT receiver circuit in an AMT system with two active sub-channels is described. The AMT receiver circuit includes an interface to receive a transmitted data transmission signal containing two symbols corresponding to the two active or utilized sub-channels of the AMT system. The receiver circuit includes two samplers to sample the received signal in parallel to produce four data samples per time interval. Each sampler has a corresponding threshold level. In some embodiments, the threshold levels of the samplers are based on a priori knowledge of the "AMT trellis," and optionally, knowledge of the response of the communication channel over which the data transmission signal is received, as explained in more detail below. The receiver circuit includes a decoder to decode the four samples to detect two data symbols corresponding to the transmitted data symbols.

An embodiment of an AMT receiver circuit in an AMT system with four active sub-channels is described. The AMT receiver circuit includes an interface to receive a transmitted data transmission signal containing four symbols corresponding to the four active or utilized sub-channels of the AMT system. In some embodiments, the receiver circuit includes at least three samplers to sample, during each time interval of a sequence of time intervals, the received signal (four symbols) in parallel. Each sampler takes four samples each. Thus, the samplers produce a total of at least twelve data samples. Each sampler has a corresponding threshold level. In some embodiments, the threshold levels of the samplers are based on a priori knowledge of the "AMT trellis," and optionally, knowledge of the response of the communication channel over which the data transmission signal is received, as explained in more detail below. The receiver circuit includes a decoder to decode the twelve samples to detect four data symbols corresponding to the transmitted data symbols.

Another embodiment of an AMT receiver circuit in an AMT system with four sub-channels, of which only two or three are active, is described. The remaining inactive sub-channels do not transmit data. The AMT receiver circuit includes an interface to receive a transmitted data transmission signal containing one symbol each corresponding to the active or utilized sub-channels of the AMT system. In some embodiments, the receiver circuit includes at least two samplers to sample, during each time interval of a sequence of time intervals, the received signal in parallel. Each sampler takes four samples each using a corresponding threshold level. In some embodiments, the threshold levels of the samplers are based on a priori knowledge of the "AMT trellis," and optionally, knowledge of the response of the communication channel over which the data transmission signal is received, as explained in more detail below. The receiver circuit includes a decoder to decode the samples to detect data symbols corresponding to the transmitted data symbols.

Figure 1:
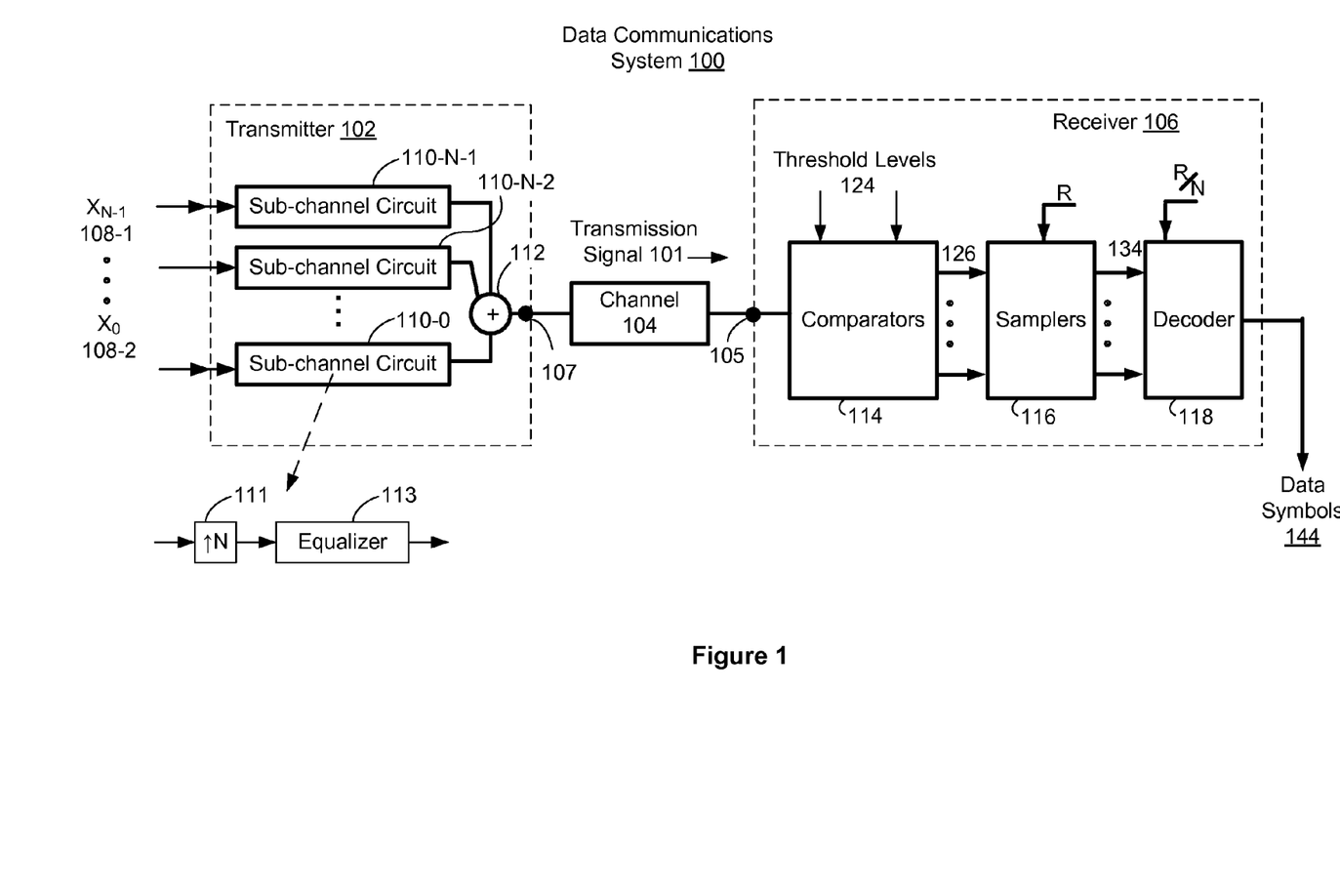
FIG. 1 is a block diagram illustrating a data communications system according to an embodiment.

FIG. 1 is a block diagram of a data communication system 100 according to some embodiments. Data communication system 100 includes a transmitter 102, a channel 104, and a receiver 106. Data communication system 100 is an AMT system, in which a communications channel 104 (also called a signaling link) is divided into multiple (N) sub-channels to implement AMT signaling, for example, in high-speed backplane links. Multi-tone systems exploit the orthogonality of a set of equally spaced sinusoids. In a multi-tone system's simplest form, one transmission block of signals is constructed as follows:

$$Y(t) = x_0 + x_{N-1}\sin(\pi N f_0 t) + \sum_{n=1}^{N/2-1} [x_{2n-1}\cos(2\pi n f_0 t) + x_{2n}\sin(2\pi n f_0 t)]$$

where $f_0$ is the symbol rate, N is the number of signals in the transmission block, and $x_n$ (n=0, 1 ..., N and $x_N$=0) is the digital data sequence that belongs to the transmission block. The above equation is valid for: $m/f_0 \leq t < (m+1)/f_0$, for m=0, 1, 2, .... For each value of m, the values of $x_0, x_1, \ldots x_{N-1}$ change.

Transmitter 102 receives digital data sequence $x_0, \ldots, x_{N-2}$, $x_{N-1}$ (108), and generates a data transmission signal 101, which is transmitted over communication channel 104 at transmitter interface 107. A plurality of parallel sub-channel circuits 110-1, ... 110-N process the digital data sequence to produce sub-channel signals that are combined by a combiner 112 (e.g., an adder or wired-OR circuit) to produce the data transmission signal 101. The data transmission signal 101 can be either a differential or single ended signal. The embodiments described below utilize differential data transmission signals. Other embodiments that use single ended data transmission signals function similarly, but use comparator thresholds shifted by a fixed amount (e.g., half the amplitude of the single ended data transmission signal) compared with embodiments that use differential data transmission signals.

In some embodiments, each of the sub-channel circuits 110 includes an up-sampler 111 and an equalizer 113. In some embodiments, the equalizer 113 equalizes a respective sub-channel signal across the bandwidth of the data transmission signal 101. In some embodiments, the digital data sequence 108 (sometimes called a data stream) is up-sampled (e.g., by the up sampler 111 in each sub-channel circuit 110) at a sampling rate greater than or equal to the sum of the symbol rates (also called the aggregate symbol rate for the communication channel) for data streams processed by the sub-channel circuits 110. A process for transmitting data in accordance with some embodiments is described in greater detail with reference to FIG. 9.

In some embodiments, channel 104 is divided into a plurality of sub-channels, such that each sub-channel corresponds to a specified frequency range of channel 104. Channel 104 adds inter-symbol interference (ISI) and/or inter-channel interference (ICI) to data transmission signal 101 transmitted by transmitter 102. As noted above, the ISI and/or ICI added to the signal 101 by the channel 104 is undesirable. In some applications, the equalizer 113 in the transmitter 102 can substantially prevent or compensate for these interference sources by pre-shaping the transmitted data streams.

Receiver 106 receives data transmission signal 101 at an interface 105. Data transmission signal 101 contains N sub-channel signals for N active sub-channels of channel 104. Data transmission signal 101 is input to a plurality of comparators 114 that compare the received data transmission signal 101, in parallel, with a plurality of distinct threshold levels 124. Each comparator compares the received signal with a respective threshold level (of the plurality of threshold levels 124), and produces a respective comparison signal 126, such that the comparators 114 together produce a plurality of comparison signals 126. In some embodiments, the threshold levels 124 of at least one of the comparators 114 is based on the magnitude of the individual sub-channels signals of the received signal. In some embodiments, the threshold levels 124 of at least one of the comparators 114 can be adjusted, for instance by adding adjustable offsets. The comparison signals 126 are sampled, during each time interval of a sequence of time intervals, by samplers 116 to produce a plurality of data sets 134 (e.g., one data set for each active sub-channel).

In some embodiments, samplers 116 sample the plurality of comparison signals 126 at a sample rate (R), which is the system throughput rate and corresponds to a total data rate of the received signal. In some embodiments, sample rate R is equal to N multiplied by a symbol rate per sub-channel ($f_o$). In some embodiments, samplers 116 include analog to digital converters (ADC) (e.g., ADC's having multiple-bit output values, or single-bit output values). In some embodiments, samplers 116 are 1-bit samplers (also called single-bit samplers).

The plurality of data sets 134 are jointly decoded by decoder 118 to determine a plurality of data symbols 144 including active the transmitted data symbols, as discussed in greater detail with reference to FIGS. 2-7. In some embodiments, decoder 118 decodes at a rate equal to a symbol rate per active sub-channel (R/N).

The data communications system 100 of FIG. 1 includes no multi-input multi-output (MIMO) decision feedback equalizer (DFE) to mitigate ISI and/or ICI on the respective sub-channel signals. In the context of the embodiments described in this document, the term "mitigates interference" means substantially cancels or substantially reduces at least one aspect (e.g., ISI or ICI) of the interference on a sub-channel signal. In the embodiment shown in FIG. 1, the transmitter 102 performs interference mitigation and the receiver 106 of the data communications system 100 jointly detects the respective sub-channel signals by jointly decoding data sets obtained from several full-rate voltage-offset samplers to determine the received symbols for all the active sub-channels.

Figure 2:
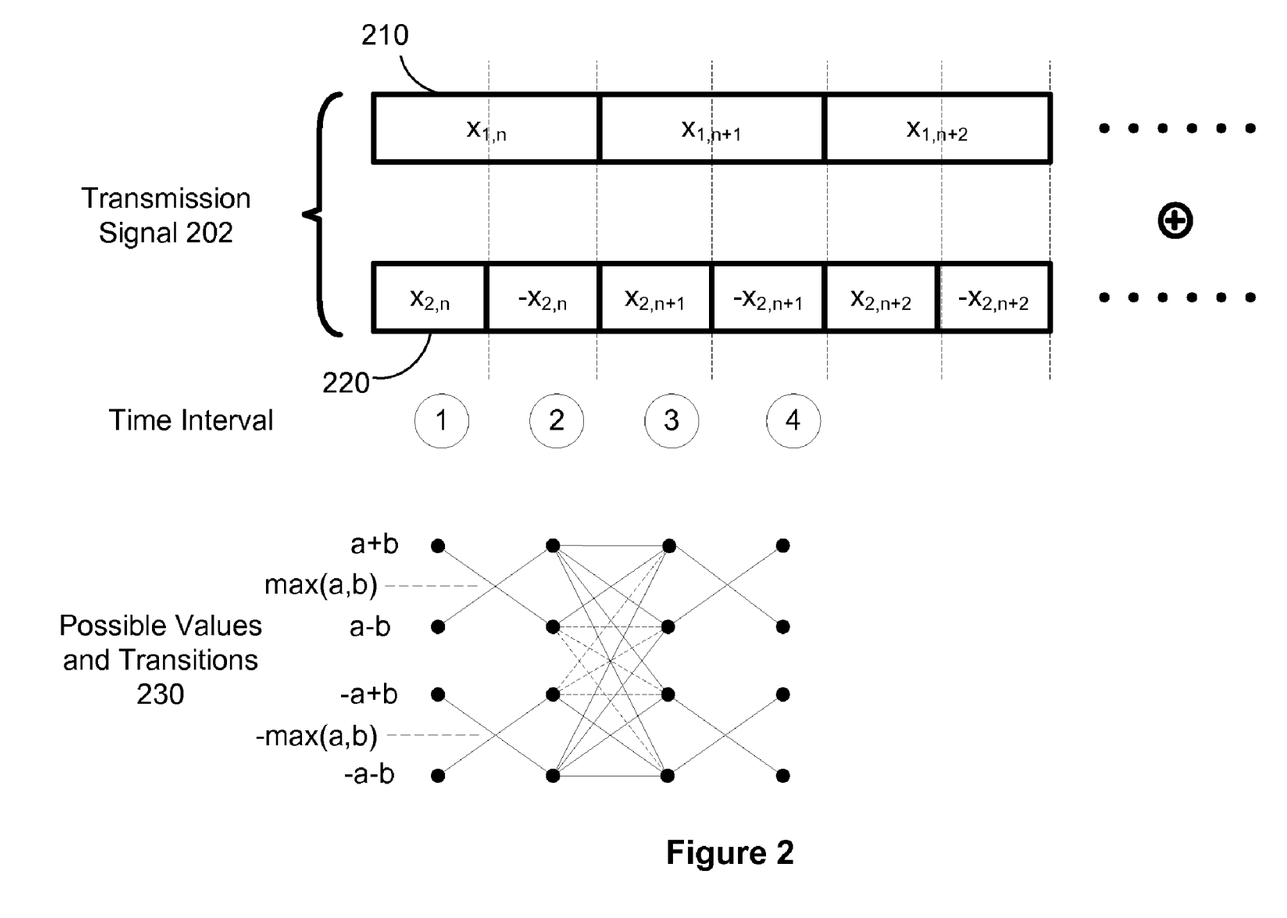
FIG. 2 is a block diagram illustrating a received sequence at the input of a data communications receiver in a system with two active sub-channels according to an embodiment.
Figure 3:
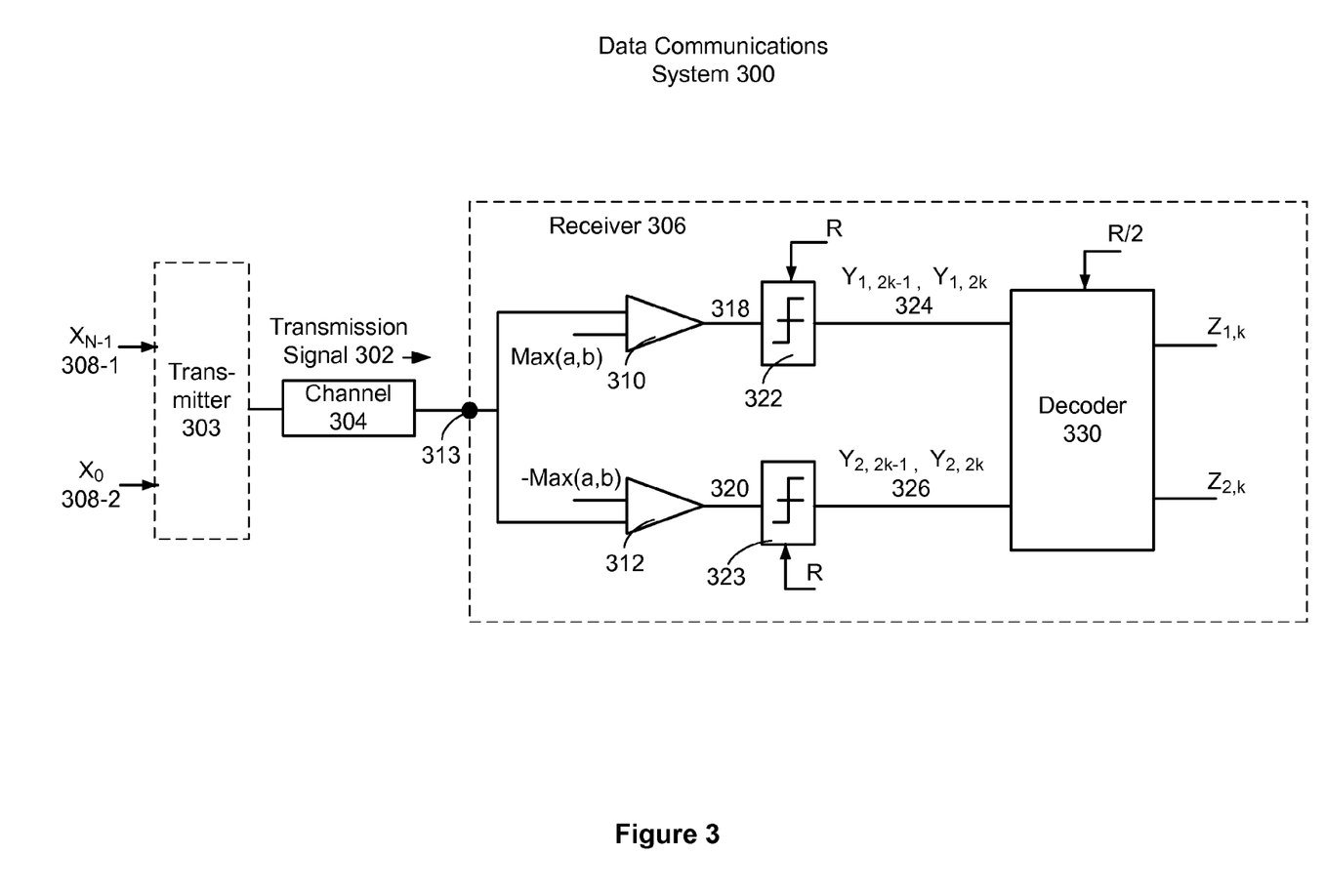
FIG. 3 is a block diagram illustrating data communications system with two active sub-channels according to an embodiment.

By way of example, FIGS. 2-3 show a data transmission signal 202 and an AMT system, such as AMT system 100 described in reference to FIG. 1, having two active sub-channels. Similarly, by way of example, FIGS. 4-7 show data transmission signals and an AMT system, such as AMT system 100 described in reference to FIG. 1, having four active sub-channels. It is noted that the embodiments disclosed herein are not limited to systems having two or four active sub-channels.

FIG. 2 is a block diagram illustrating a data transmission signal 202 in a multi-tone system, such as the one shown in FIG. 1, with two active sub-channels (N=2). Data transmission signal 202 is transmitted by a transmitter, such as transmitter 102, over a communication channel, such as channel 106, and is received at an input of receiver, such as receiver 106, according to some embodiments. During a sequence of time intervals including time intervals 1, 2, 3 and 4, data transmission signal 202 includes digital data sequence 210 (transmitted sequence for sub-channel 1 of the two active sub-channels) and digital data sequence 220 (transmitted sequence for sub-channel 2 of the two active sub-channels). In some embodiments, data transmission signal 202 is a summation of the two sequences 210 and 220, either or both of which may be scaled by the communication channel, such as channel 106. The sequence of time intervals including time intervals 1, 2, 3 and 4 is also referred to as a two symbol periods. The sequence of time intervals including time intervals 1 and 2 constitute a first symbol period, and the sequence of time intervals including time intervals 3 and 4 constitute a second symbol period.

Treating all possible received symbols at time interval 1 as received constellation points, FIG. 2 also depicts an AMT trellis, which shows the possible received signal values and transitions 230 for the data transmission signal 202 in an AMT data communications system, such as system 100, during a sequence of time intervals. Some possible transitions are shown with dashed lines while others are shown with solid lines for ease of reference. A receiver according to some embodiments, such as receiver 106, makes use of knowledge of the AMT trellis, as explained below. The magnitude of the received symbols (also called received signals) for sub-channels 1 and 2 are "a" and "b," respectively. In a functional system, the magnitudes of both "a" and "b" are large enough to be resolvable by the receiver. In FIG. 2, to facilitate explanation of this embodiment of the invention it is assumed "a" is greater than or equal to "b", but such an assumption is not necessary.

As shown in FIG. 2, during a first time interval, the magnitude of the data transmission signal 202 received at an AMT receiver is one of "a+b", "a−b", "−a+b" and "−a−b". As illustrated in FIG. 2, at half-symbol transitions (time interval 1→time interval 2, time interval 3→time interval 4, etc.), only a selected number of transitions are possible. For example, if the received signal during time interval 1 has a magnitude corresponding to "a+b", the detected signal during time interval 2 is guaranteed to have a magnitude corresponding to "a−b". During a third time interval, the data transmission signal 202 can transition from a magnitude of "a−b" (during time interval 2) to one of "a+b", "−a+b", "−a−b" or "a−b" (during time interval 3). During a fourth time interval, the data transmission signal 202 can transition to a magnitude to "a−b" if it was "a+b" during the third time interval, to a magnitude to "−a−b" if it was "−a+b" during the third time interval, to a magnitude to "−a+b" if it was "−a−b" during the third time interval, or to a magnitude to "a+b" if it was "a−b" during the third time interval. For sake of simplicity, the possible values and transitions during the time intervals are shown in Table 1 below:

TABLE 1

| Time Interval 1 | Time Interval 2 | Time Interval 3 | Time Interval 4 |
|---|---|---|---|
| (a + b) | (a − b) | (a + b) or | (a − b) |
|  |  | (−a + b) or | (−a − b) |
|  |  | (−a − b) or | (−a + b) |
|  |  | (a − b) | (a + b) |
| (a − b) | (a + b) | (a − b) or | (a + b) |
|  |  | (−a + b) or | (−a − b) |
|  |  | (−a − b) or | (−a + b) |
|  |  | (a + b) | (a − b) |
| (−a +b) | (−a −b) | (a + b) or | (a − b) |
|  |  | (a − b) or | (a+) |
|  |  | (−a + b) or | (−a − b) |
|  |  | (−a − b) | (−a + b) |
| (−a − b) | (−a + b) | (a + b) or | (a − b) |
|  |  | (a − b) or | (a+) |
|  |  | (−a − b) or | (−a + b) |
|  |  | (−a + b) | (−a − b) |

Furthermore, the minimum distance between a received sample magnitude "a+b" and all other possible received sample magnitudes (i.e., all other possible combinations of "a" and "b", such as "a−b", "−a+b", "−a−b") is 2 min(a,b). Similarly, the minimum distance between a received sample magnitude "−a−b" and all other possible received sample magnitudes ("a−b", "−a+b", "a+b") is 2 min(a,b). Therefore, it is meaningful to place a sampler with threshold set to a level corresponding to a magnitude of "a+b−min(a,b)" or equivalently at "max(a,b)" to detect any instances where the received signal is "a+b". In the same way, placing a sampler with threshold at "−max(a,b)" can detect any instance when the received signal is "−a−b". These sampling thresholds are shown in FIG. 2. Accordingly, in an AMT system with two active sub-channels, two comparators 114 may be used with respective distinct threshold values 124 of a positive maximum value (also called the maximum positive value, maximum value or maximum magnitude) and a negative maximum value (also called the maximum negative value, minimum value or minimum magnitude) of the received signal magnitudes ("a" and "b" respectively) for the two sub-channels. Thus, in some embodiments, threshold levels 124 for comparators 114 are based on a priori knowledge of the AMT trellis (the possible signal transitions), and optionally, knowledge of communication channel (such as channel 104) response (e.g., attenuation of sub-channel signals in each of the active sub-channels).

FIG. 3 illustrates an embodiment of an AMT data communications system 300 with two active sub-channels. Transmitter 303 receives a data stream 308 and transmits a data transmission signal 302 over channel 304. Receiver 306 receives a data transmission signal 302 transmitted by transmitter 303 over a channel 304 at an interface 313. In some embodiments, data transmission signal 302 is the same as data transmission signal 202 discussed with reference to FIG. 2.

Received data transmission signal 302 is input to two comparators 310 and 312. In some embodiments, comparators 310 and 312 are analog comparators that receive data transmission signal 302. Comparator 310 compares received data transmission signal 302 with a first threshold level to produce a first comparison signal 318. In some embodiments, first threshold level is equal to a maximum value (e.g., max(a,b)) of the amplitude ("a" and "b") of the sub-channel signals that make up data transmission signal 302. In parallel, comparator 312 compares received data transmission signal 302 with a second threshold level to produce a second comparison signal 320. In some embodiments, second threshold level is equal to a minimum value (e.g., −max(a,b)) of the amplitude ("a" and "b") of the sub-channel signals that make up data transmission signal 302. The minimum value of the amplitude of the sub-channel signals is sometimes called the maximum negative value or negative maximum value of the sub-channel signals. In some embodiments, the threshold values of at least one of the comparators 310 and 312 can be adjusted, for instance by adding adjustable gains. In some embodiments, comparison signals 318 and 320 are voltage signals.

Comparison signal 318 (produced by the first comparator 310) is sampled by sampler 322 during each time interval of a sequence of time intervals to produce a first data set 324. Comparison signal 320 (produced by the second comparator 312) is sampled by sampler 323 during each time interval of a sequence of time intervals to produce a second data set 326. Alternately stated, the samplers 322, 323 sample the received signal by sampling the comparison signals. In some embodiments, samplers 322 and 323 are binary analog to digital comparators (ADCs). Samplers 322 and 323 sample at substantially the same time, and while sampler 322 has a positive offset, sampler 323 has a negative offset. In some embodiments, samplers 322 and 323 are 1-bit samplers that sample the respective comparison signals at a rate equal to or greater than a sample rate (R), which is the system throughput rate that corresponds to a total data rate of received signal 302. Thus, during a first time interval, samplers 322 and 323 respectively produce data points $Y_{1,2k-1}$ and $Y_{2,2k-1}$, and in a second time interval, samplers 322 and 324 respectively produce data points $Y_{1,2k}$ and $Y_{2,2k}$, and so on.

Data sets 324 and 326 produced by samplers 322 and 323 during one data period (including the sequence of time intervals 1, 2, 3 and 4) are jointly decoded by decoder 330 to determine a plurality of data symbols, including the transmitted data symbols. As shown in FIG. 3, decoder 330 determines data symbol $Z_{1,k}$ and data symbol $Z_{2,k}$ at a rate of R divided by 2, which is the symbol rate per channel. In some embodiments, decoder 330 decodes data sets produced by samplers 322 and 323 based on the knowledge of possible transitions of received data transmission signal 302 in an analog multi-tone system, as discussed in reference to FIG. 2 and Table 1. For instance, in a first symbol period (including the sequence of time intervals 1 and 2), if sampler 322 detects a level corresponding to '1', then decoder 330 determines that a signal with a magnitude of "a+b" was transmitted. This is because, in the AMT trellis for this system, the only signal level having magnitude greater than "a" and "b" is "a+b". Likewise, if sampler 323 detects a '−1', then decoder 330 determines that a signal with a magnitude of "−a−b" was transmitted. This is because, in the AMT trellis for this system, the only signal level having magnitude less than "−a" and "−b" is "−a−b". If, in the first symbol period, sampler 322 does not detect a level corresponding to "1" and sampler 323 does not detect a level corresponding to "−1", then according to Table 1, a signal with a magnitude of either "−a+b" or "a−b" was transmitted during the first symbol period. Accordingly, in the second half-symbol period (including the sequence of time intervals 3 and 4), if sampler 322 detects a '1', then decoder 330 determines that a signal with a magnitude of "a−b" was transmitted, and if sampler 323 detects a '−1', then decoder 330 determines that a signal with a magnitude of "−a+b" was transmitted. A truth table for decoder 330 is illustrated in Table 2 as follows:

TABLE 2

AMT System with two sub-channels

| $Y_{1,2k-1}$ | $Y_{2,2k-1}$ | $Y_{1,2k}$ | $Y_{2,2k}$ | $Z_{1,k}$ | $Z_{2,k}$ |
|---|---|---|---|---|---|
| 1 | X | X | X | 1 | 1 |
| X | −1 | X | X | −1 | −1 |
| X | X | 1 | X | 1 | −1 |
| X | X | X | −1 | −1 | 1 |

Figure 4:
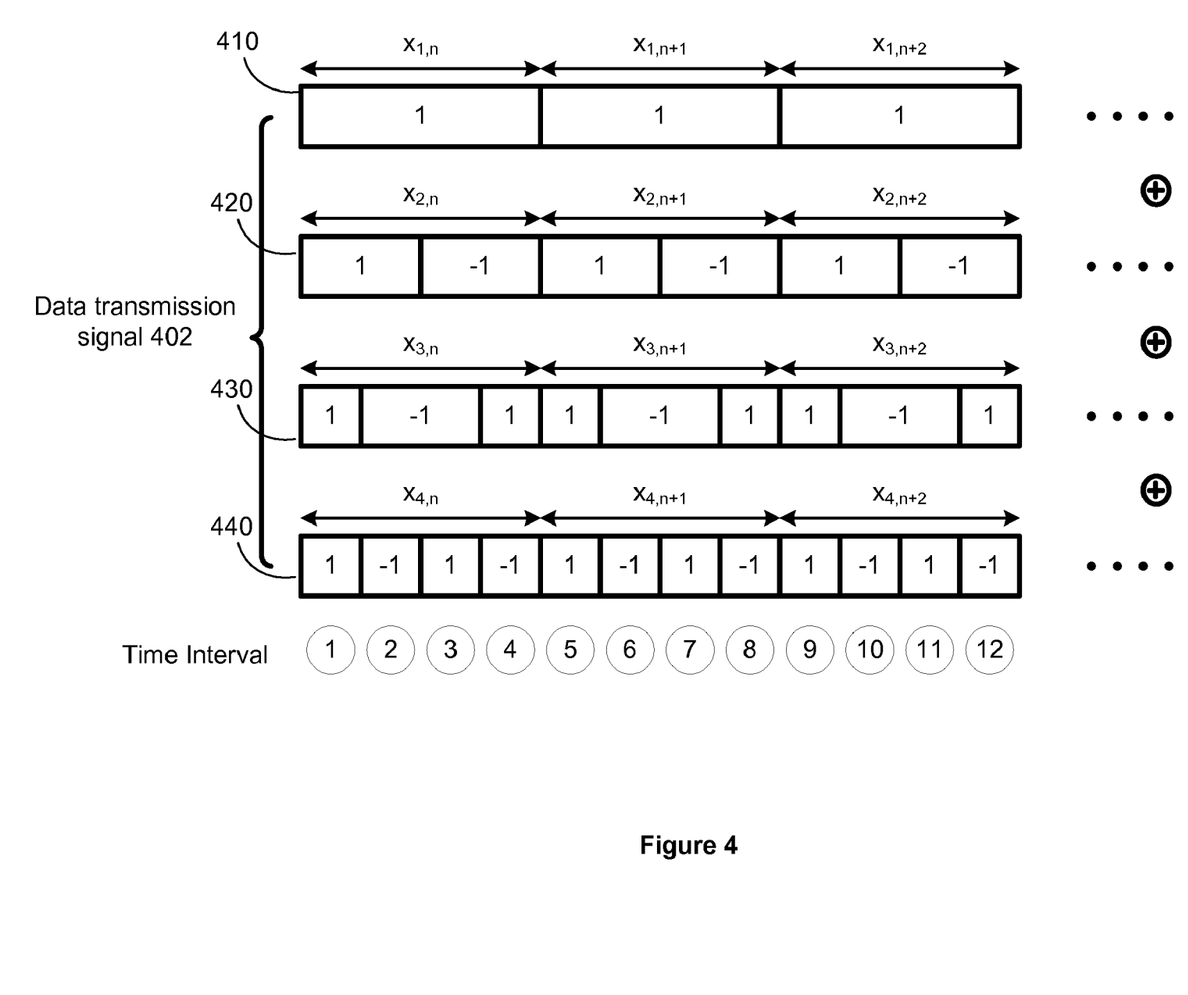
FIG. 4 is a block diagram illustrating a received sequence at the input of a data communications receiver in a system with four active sub-channels according to an embodiment.
Figure 5:
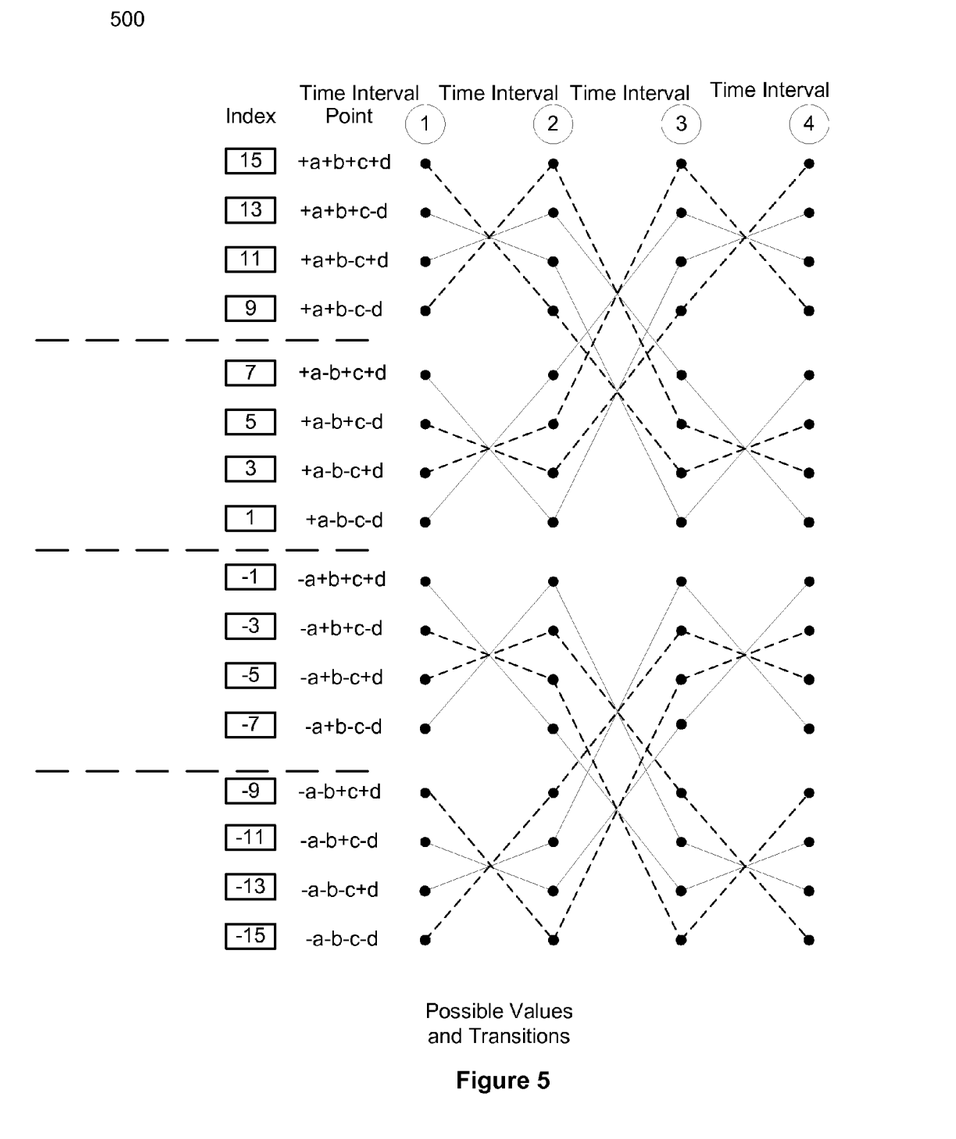
FIG. 5 is a diagram illustrating possible transitions of a received sequence at the input of a data communications receiver in a system with four active sub-channels according to an embodiment.

FIG. 4 is a block diagram illustrating a data transmission signal 402 in a multi-tone system, such as the one shown in FIG. 1, with four active sub-channels (N=4). Data transmission signal 402 is transmitted by a transmitter, such as transmitter 102, and is received at an input of a receiver, such as receiver 106, according to some embodiments. During a sequence of time intervals (e.g., time intervals 1-4) that constitute a data period or symbol period, data transmission signal 402 includes digital data sequence 410 (transmitted sequence for sub-channel 1 of the four sub-channels), digital data sequence 420 (transmitted sequence for sub-channel 2 of the four sub-channels), digital data sequence 430 (transmitted sequence for sub-channel 3 of the four sub-channels), and digital data sequence 440 (transmitted sequence for sub-channel 4 of the four sub-channels). FIG. 4 shows three symbol periods of a data transmission signal 402, while FIG. 5 shows all possible signal states of the same data transmission signal 402 during a single symbol period.

Figure 6:
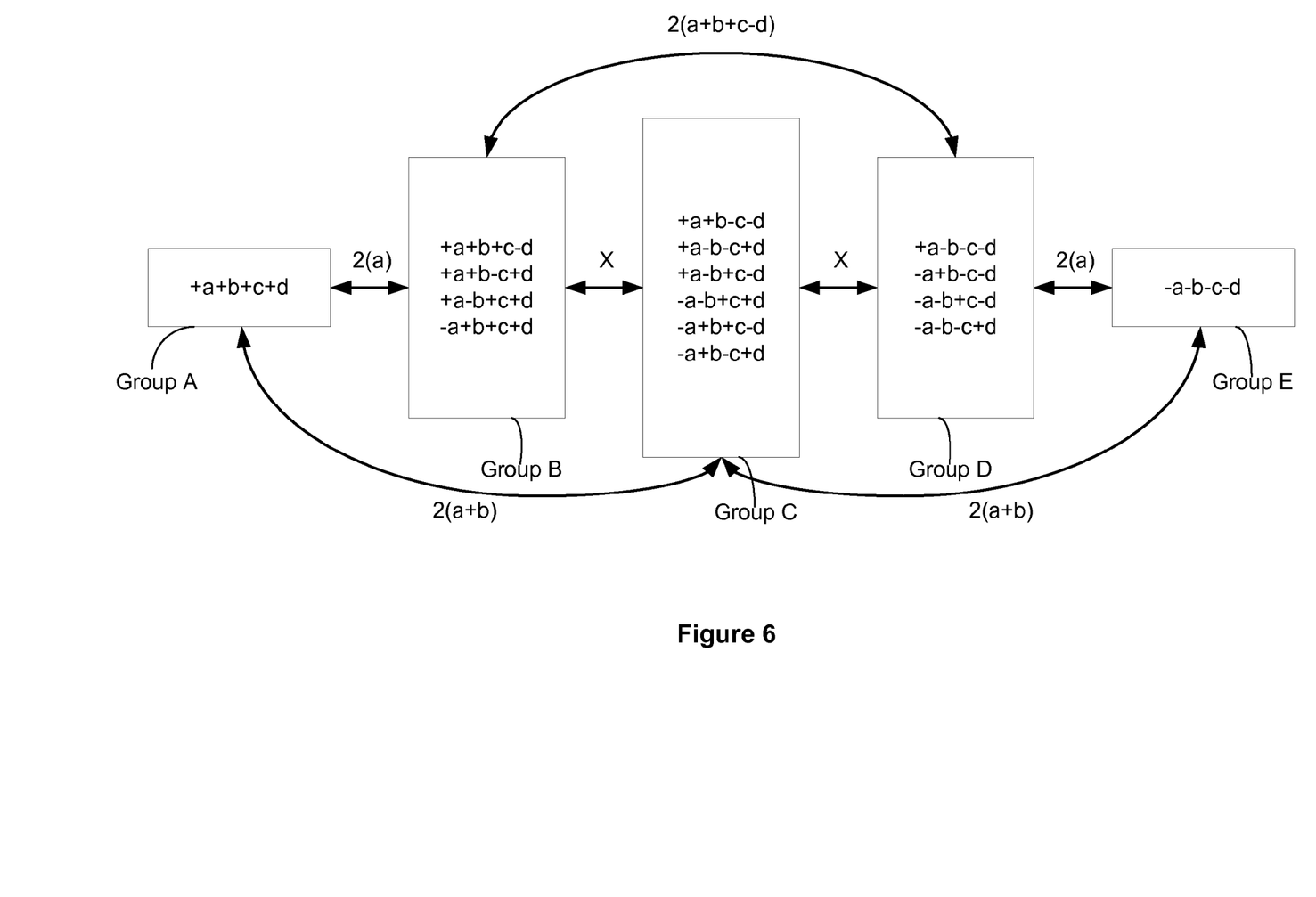
FIG. 6 is a diagram illustrating grouping of received constellation points to determine decoding logic for a data communications system with four active sub-channels according to an embodiment.

A receiver according to some embodiments, such as receiver 106 makes use of a priori knowledge of the AMT trellis, and optionally, communication channel (such as channel 106) response for the active sub-channels. It is assumed that the $1^{st}$ sub-channel signal of the received signal has a signal magnitude of "a", and the $2^{nd}$, $3^{rd}$ and $4^{th}$ sub-channels signals have signal magnitudes of "b", "c", and "d," respectively. FIG. 5 depicts an AMT trellis 500, showing all possible state transitions of a data transmission signal, in a system having four active sub-channels, within one symbol period (consisting of four time intervals). Treating all possible received symbols at time interval 1 as received constellation points, FIG. 6 shows the points grouped into five different bins with minimum distance between the bins also marked. "X" represents an unknown quantity (a quantity whose value depends on the exact relationship between a, b, c, d and is not necessarily larger than 2 min(a,b,c,d)). Without loss of generality it is assumed $a \leq b \leq c \leq d$. It is further assumed that $b+c \geq d$. This is a reasonable assumption because in an optimized system, "a", "b", "c", and "d" should all be of the same or similar magnitude. The minimum distance between the point "+a+b+c+d" and all other points is 2 min(a,b,c,d). Therefore, a sampler with threshold at +a+b+c+d−min(a,b,c,d) can correctly detect whether the state "+a+b+c+d" has been visited. Similarly, the minimum distance between the point "−a−b−c−d" and all other points is 2 min(a,b,c,d). Thus, a sampler placed at a threshold corresponding to "−a−b−c−d+min(a,b,c,d)" can detect a transition to the state "−a−b−c−d".

Referring again to FIG. 5, the data transmission signal has sixteen possible states, each of which has been assigned an index between −15 and 15. For convenience, a data transmission signal that is in (or at) a state having an index of 15, 13, or 11 (and so on) may be said to be in (or at) state 15, 13, or 11, respectively. Data transmission signals that begin a symbol period in state −15, −9, −5, −3, 3, 5, 9, or 15 visit either state "−a−b−c−d" (also called state −15) or state "+a+b+c+d" (also called state 15) in exactly one time interval (e.g., time interval 1, 2, 3 or 4) during the symbol period. These data transmission signals, which begin in state −15, −9, −5, −3, 3, 5, 9, or 15, are shown using dashed lines in FIG. 5 and as Groups A, C and E in FIG. 6. Among the sixteen states shown in FIG. 5, indexed from −15 to 15, data transmission signals that begin a symbol period in state −13, −11, −7, −1, 1, 7, 11, or 13 do not visit either state "−a−b−c−d" or state "+a+b+c+d" in any of the time intervals of that symbol period. Signals that begin a symbol period in state −13, −11, −7, −1, 1, 7, 11, or 13 are shown using solid lines in FIG. 5 and as Groups B and D in FIG. 6.

Groups A, C and E of FIG. 6 represent data transmission signal states whose four sub-channel components have exactly four "−1"s, two "−1"s or no "−1"s among them (+a+b+c+d, +a+b−c−d, +a−b+c−d, +a−b−c+d, −a+b−c+d, −a+b+c−d, −a−b+c+d). Groups B and D of FIG. 6 represent data transmission signal states whose four sub-channel components have exactly one or three "−1"s (+a+b+c−d, +a+b−c+d, +a−b+c+d, −a+b+c+d, +a−b−c−d, −a+b−c−d, a−b+c−d, −a−b−c+d). In Groups B and D, with the assumptions (already stated above) that $a \leq b \leq c \leq d$ and $d \leq b+c$, half of the signal states represent signals that have magnitudes larger than "2a" and half of the signal states represent signals that have magnitudes less than "−2a". Therefore, upon knowing that the state of a received signal belongs to Groups B and D, a sampler placed at zero can correctly determine whether the state of the received signal belongs to the positive half or the negative half of these signal states. Upon tracking the eight signal states in Groups B and D during the four time intervals of a symbol period, the following pattern illustrated in Table 3 for signs (a positive corresponds to "+1", a negative corresponds to "−1") of a detected signal with a sampler placed at zero is observed:

TABLE 3

| Index | Interval 1 | Interval 2 | Interval 3 | Interval 4 |
|-------|------------|------------|------------|------------|
| 13    | +          | +          | −          | +          |
| 11    | +          | +          | +          | −          |
| 7     | +          | −          | +          | +          |
| 1     | −          | +          | +          | +          |
| −1    | +          | −          | −          | −          |
| −7    | −          | +          | −          | −          |
| −11   | −          | −          | −          | +          |
| −13   | −          | −          | +          | −          |

Figure 7:
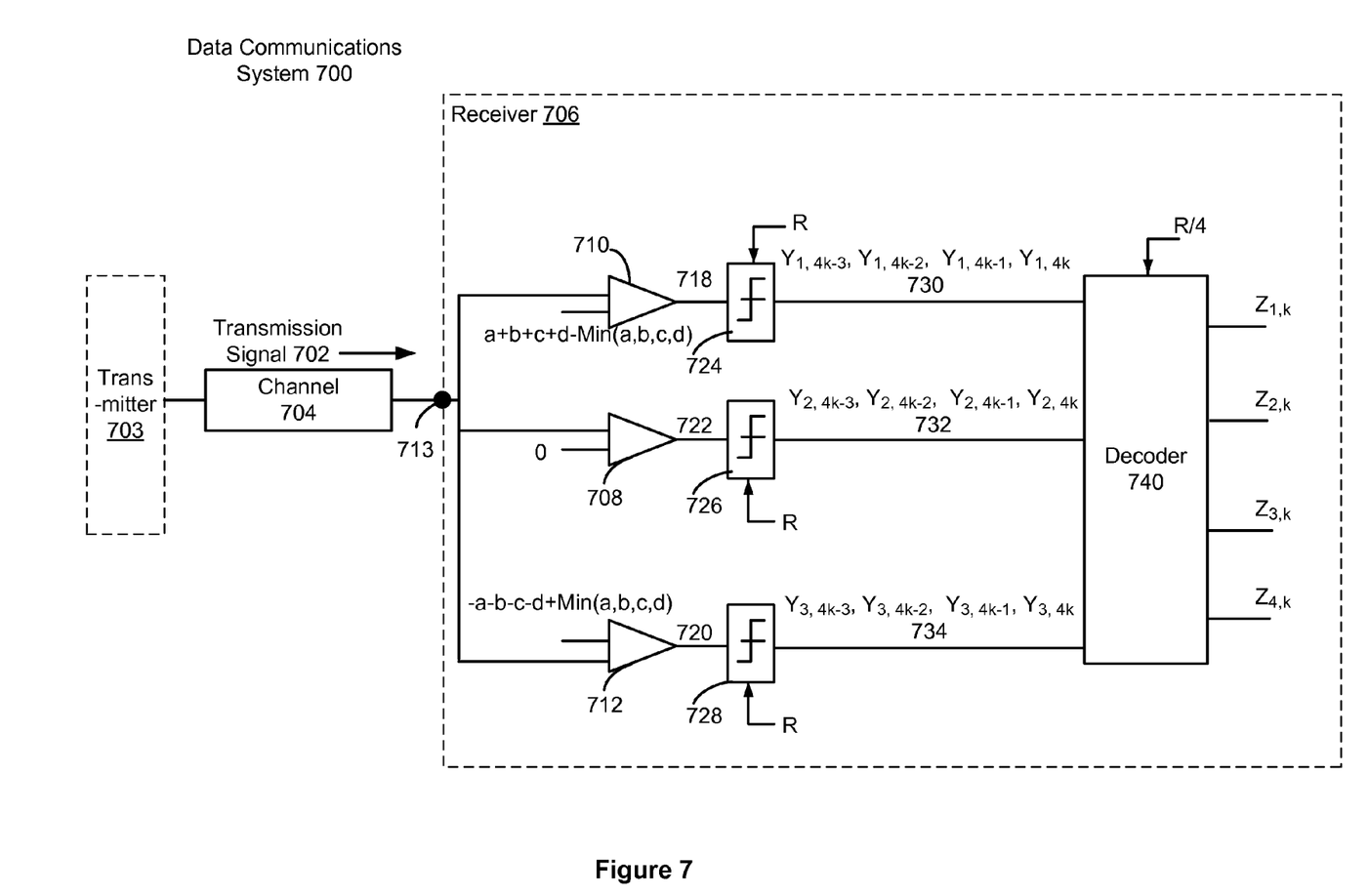
FIG. 7 is a block diagram illustrating a data communications system with four active sub-channels according to an embodiment.

FIG. 7 illustrates an embodiment of an AMT data communications system 700 with four active sub-channels. Receiver 706 receives a data transmission signal 702 transmitted by transmitter 703 over a channel 704 at an interface 713. In some embodiments, data transmission signal 702 is the same as data transmission signal 402 discussed with reference to FIG. 4. Received data transmission signal 702 is input to three comparators 708, 710 and 712. In some embodiments, comparators 708, 710 and 712 are analog comparators that receive data transmission signal 702. Comparator 710 compares received data transmission signal 702 with a first threshold level to produce a first comparison signal 718. In parallel, comparator 712 compares received data transmission signal 702 with a second threshold level to produce a second comparison signal 720. In parallel, comparator 708 compares received data transmission signal 702 with a third threshold level to produce a second comparison signal 722. In some embodiments, based on a priori knowledge of possible transitions of the received signal in the analog multi-tone system (also herein called a priori knowledge of the AMT Trellis), and optionally, knowledge of communication channel 704 response, the first threshold level is equal to "a+b+c+d−Min(a,b,c,d)", the second threshold level is equal to "−a−b−c−d+Min(a,b,c,d)" and the third threshold level is equal to zero. In some embodiments, comparison signals 718, 720 and 722 are voltage signals.

Comparison signal 718 is sampled by sampler 724 during each time interval of a sequence of time intervals (e.g., for one symbol period) to produce a first data set 730. Comparison signal 722 is sampled by sampler 726 during each time interval of a sequence of time intervals to produce a second data set 732. Comparison signal 720 is sampled by sampler 728 during each time interval of a sequence of time intervals to produce a third data set 734. It is noted here that the number of samplers 724, 726, 728 in this embodiment is fewer than the number of active sub-channels. In some embodiments, samplers 724, 726 and 728 are binary analog to digital converters (ADCs). In some embodiments, samplers 724, 726 and 728 are 1-bit samplers (sometimes called binary samplers) and sample at sample rate (R), which is the system throughput rate and corresponds to a total data rate of received signal 702. In some embodiments, samplers 724, 726 and 728 sample at a rate greater than sample rate R. During a first time interval, samplers 724, 726 and 728 respectively produce $Y_{1,4k-3}$, $Y_{2,4k-3}$, and $Y_{3,4k-3}$, and during a second time interval, samplers 724, 726 and 728 respectively produce $Y_{1,4k-2}$, $Y_{2,4k-2}$, and $Y_{3,4k-2}$, and so on.

Data sets 730, 732 and 734 respectively produced by samplers 724, 726 and 728 during the sequence of time intervals that correspond to a data period are jointly decoded by decoder 740 to determine a plurality of data symbols including at least one data symbol for each of the four sub-channels. As shown in FIG. 7, decoder 740 determines four data symbols $Z_{1,k}$, $Z_{2,k}$, $Z_{3,k}$, and $Z_{4,k}$ for sub-channels 1, 2, 3, and 4, respectively, at a rate of R divided by 4 (R/4), which represents the symbol rate per active sub-channel. In some embodiments, decoder 740 decodes data sets produced by samplers 724, 726 and 728 based on the knowledge of possible transitions of received data transmission signal 702 in an analog multi-tone system (a priori knowledge of the AMT Trellis) and communication channel (such as channel 704 response), as discussed above in reference to FIGS. 4-6. Decoder block 740 has the following truth table: If $Y_{1,4k-j}=1$ or $Y_{3,4k-j}=-1$ for any of the time-intervals j=3, 2, 1, 0) of a symbol period, then the received symbol $Z_{i,k}$ belongs to Group A, C or E (of FIG. 6) and can be decoded as follows:

TABLE 4

|  | J = 3 (Interval 1) | J = 2 (Interval 2) | J = 1 (Interval 3) | J = 0 (Interval 4) |
|---|---|---|---|---|
| $Y_{1,4k-j}=$ | (1, 1, 1, 1) | (1, 1, −1, −1) | (1, −1, −1, 1) | (1, −1, 1, −1) |
| $Y_{3,4k-j}=$ | (−1, −1, −1, −1) | (−1, −1, 1, 1) | (−1, 1, 1, −1) | (−1, 1, −1, 1) |

If $Y_{1,4k-j}=-1$ and $Y_{3,4k-j}=+1$ for all time-intervals (j=3, 2, 1, 0) of a symbol period, then the received symbol belongs to the Groups B and D (of FIG. 6). In this case, decoder block 740 can decode based on the data in the first four columns of Table 3 (note that data from any three of the four time intervals 1, 2, 3 and 4 in Table 3 is sufficient for decoding).

Figure 8:
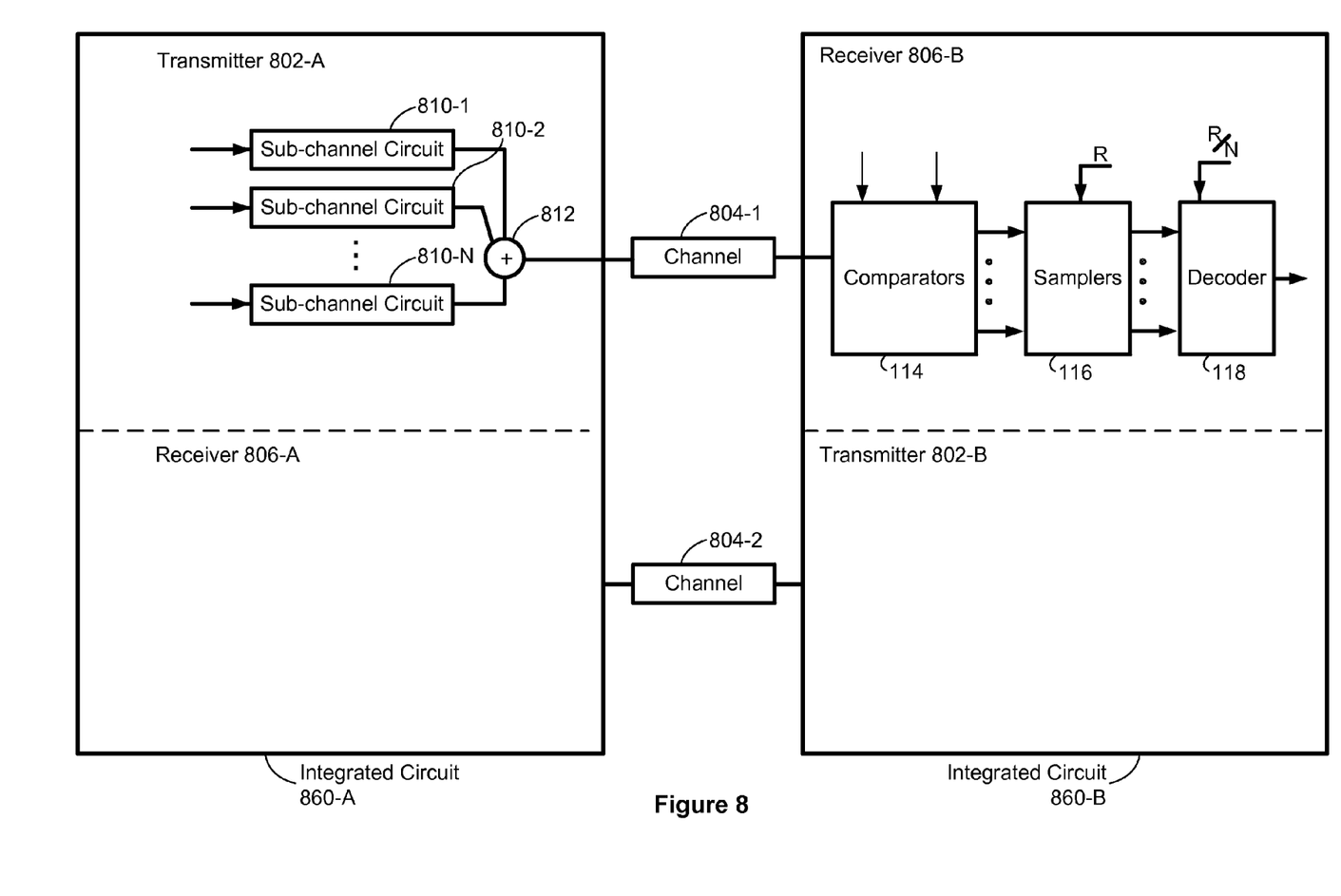
FIG. 8 is a block diagram of two integrated circuits, each including a transmitter and a receiver, in accordance with some embodiments.

FIG. 8 is a block diagram of two integrated circuits 860-A and 860-B, each having a transmitter 802 and a receiver 806, in accordance with some embodiments. In some embodiments, each transmitter 802 includes components (e.g., sub-channel circuits 810 and a combiner 812) described above with regard to FIG. 1. Similarly, each receiver 806 includes the components described above with regard to FIG. 1, 3, or 7. In some embodiments, integrated circuit 860-A transmits a first data transmission signal to integrated circuit 860-B via channel 804-1 and receives a second data transmission signal from integrated circuit 860-B via channel 804-2. Alternatively, integrated circuit 860-A both transmits and receives data transmission signals via a single channel (not shown). The first and second data transmission signals each include two or more sub-channel signals.

This document describes embodiments having two (N=2) and four (N=4) active sub-channels. It is noted that the present invention can be used with other numbers of active sub-channels, including three active sub-channels (which may be implemented using either a portion of the circuitry for four sub-channels, with the circuitry for one sub-channel being eliminated or inactive, or using circuitry optimized for three sub-channels), and eight active sub-channels (N=8). In each implementation, the receiver will have a set of samplers that sample the received signal at a set of threshold levels, at a sampling rate larger than the symbol rate, and a decoder that jointly decodes the sampled values for a symbol period to produce a set of data values. In embodiments with four or more active sub-channels, the number of samplers may be less than the number of active sub-channels, and the samplers may be 1-bit samplers.

Figure 9:
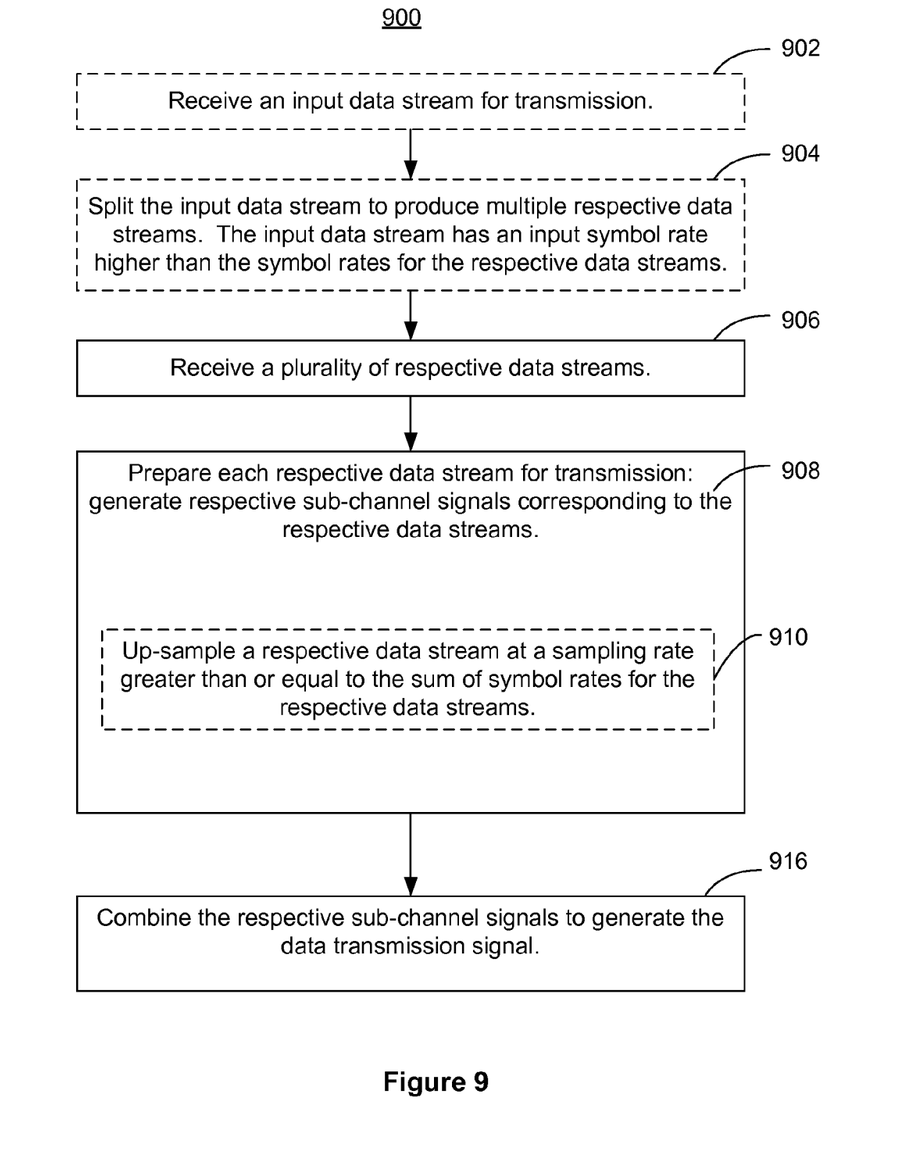
FIG. 9 is a flow diagram illustrating a process for transmitting data in accordance with some embodiments.

FIG. 9 is a flow diagram illustrating a process for transmitting data in accordance with some embodiments. In some embodiments, process 900 is performed in conjunction with a transmitter in a data communications system (e.g., transmitter 102, FIG. 1; transmitter 303, FIG. 3; or transmitter 703, FIG. 7).

In some embodiments, optionally an input data stream is received for transmission (902). Optionally, the input data stream is split to produce multiple respective data streams. An input data stream may have an input symbol rate higher than the symbol rates for the respective data streams (904). A plurality of respective data streams (e.g., data streams 108, FIG. 1) are received (906). In embodiments that include operations 902 and 904, the plurality of respective data streams corresponds to the multiple respective data streams into which the input data stream is split. Alternatively, the respective data streams are independent data streams.

Each respective data stream is prepared for transmission (908). For example, each data stream is processed by a respective sub-channel circuit 110, as shown in FIG. 1. Respective sub-channel signals are generated corresponding to the respective data streams. In some embodiments, the respective data streams are prepared in parallel for transmission, such that the corresponding respective sub-channel signals are generated in parallel. In some embodiments, each respective sub-channel signal is equalized across the bandwidth of a data transmission signal. In some embodiments, a respective data stream is up-sampled at a sampling rate greater than or equal to the sum of the symbol rates for the respective data streams (910). The respective sub-channel signals are combined (e.g., by combiner 112, FIG. 1) to generate the data transmission signal (916).

Figure 10:
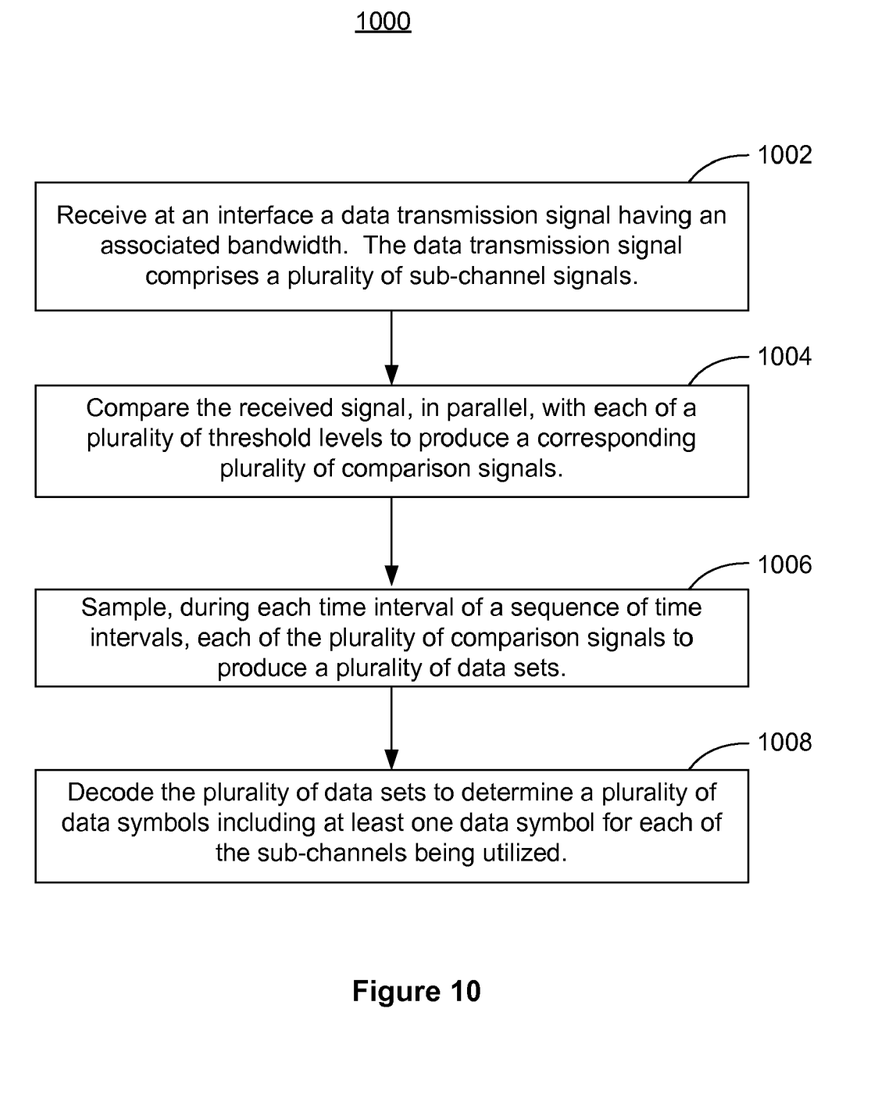
FIG. 10 is a flow diagram illustrating a process for receiving data in accordance with some embodiments.

FIG. 10 is a flow diagram illustrating a process 1000 for receiving data in accordance with some embodiments. In some embodiments, process 1000 is performed in conjunction with a receiver in a data communications system (e.g., receiver 106, FIG. 1; receiver 306, FIG. 3; or receiver 706, FIG. 7).

A data transmission signal composed of a plurality of sub-channel signals is received at an interface (1002). For example, the data transmission signal 302 is received at interface 313 between receiver 306 and channel 304 (FIG. 3). Similarly, for example, the data transmission signal 702 is received at interface 713 between receiver 706 and channel 704 (FIG. 7).

Received data transmission signal is compared, in parallel, with each of a plurality of distinct threshold levels to produce a corresponding plurality of comparison signals (1004). For example, data transmission signal 302 received at interface 313 is compared with respective threshold levels by samplers 310 and 320 to produce respective comparison signals 318 and 320 (FIG. 3). Similarly, for example, data transmission signal 702 received at interface 713 is compared with respective threshold levels by samplers 708, 710 and 712 (FIG. 7).

Each of plurality of comparison signals is sampled, during each time interval of a sequence of time intervals, to produce a plurality of data sets (1006). For example, comparison signals 318 and 320 are sampled by full-rate binary samplers 322 and 323 to produce respective data sets 324 and 326 (FIG. 3). Similarly, for example, comparison signals 718, 720 and 722 are sampled by full-rate samplers 724, 728 and 726, respectively, to produce respective data sets 730, 734 and 732, respectively (FIG. 7).

The total number of samples for all the active sub-channels during one symbol period is larger than the total number of bits to be detected during that symbol period. Thus, a number of redundant samples are created and used to collectively implement an AMT receiver. The plurality of data sets are decoded to determine a plurality of data symbols including at least one data symbol for each of the sub-channels being utilized (1008). For example, data sets 324 and 326 are jointly decoded by decoder 740 to determine data symbols $Z_{1,k}$ and $Z_{2,k}$ for each symbol period. Similarly, for example, data sets 730, 734 and 732 are jointly decoded by decoder 740 to determine data symbols $Z_{1,k}$, $Z_{2,k}$, $Z_{3,k}$, $Z_{4,k}$, for each symbol period.

Figure 11:
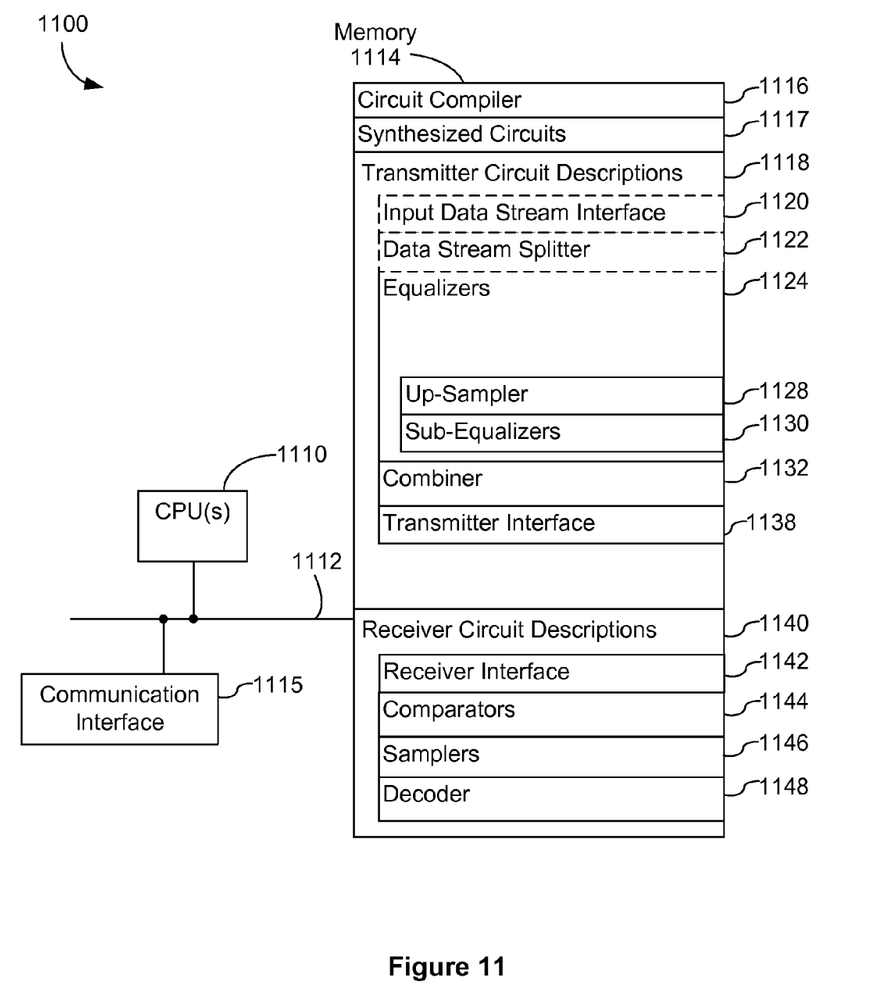
FIG. 11 is a block diagram of a system for storing computer readable files containing software descriptions of circuits for implementing transmitters and receivers in accordance with some embodiments.

FIG. 11 is a block diagram of an embodiment of a system 1100 for storing computer readable files containing software descriptions of circuits for implementing transmitters and receivers in accordance with some embodiments. The system 1100 may include one or more data processors or central processing units (CPU) 1110, memory 1114, one or more communication interfaces 115 for communicating with other devices, computers or systems, and one or more signal lines or communication busses 1112 for coupling these components to one another. The communication buses 1112 may include circuitry (sometimes called a chipset) that interconnects and controls communications between system components. Memory 1114 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1114 may optionally include one or more storage devices remotely located from the CPU(s) 1110. Memory 1114, or alternately the non-volatile memory device(s) within memory 1114, comprises a computer readable storage medium. In some embodiments, the computer readable storage medium of memory 1114 stores in one or more of the previously mentioned memory devices a circuit compiler 1116, transmitter circuit descriptions 1118, and receiver circuit descriptions 1140. Alternately, the circuit descriptions stored in the computer readable storage medium may include descriptions of a subset of the aforementioned circuits, and may optionally include descriptions of additional circuits. The circuit compiler 1116, when executed by a processor such as CPU 1110, processes one or more circuit descriptions to synthesize one or more corresponding circuits (synthesized circuits 1117).

In some embodiments, transmitter circuit descriptions 1118 include circuit descriptions for programmable full-band linear equalizers 1124, a combiner 1132, and a transmitter interface 1138. In some embodiments, the circuit description for equalizers 1124 includes circuit descriptions for up-samplers 1128, and sub-circuit equalizers 1130. In some embodiments, transmitter circuit descriptions 1118 also include an input data stream interface 1120, a data stream splitter 1122. Alternately, the transmitter circuit descriptions 1118 stored in the computer readable storage medium may include descriptions of a subset of the aforementioned circuits, and may optionally include descriptions of additional circuits.

In some embodiments, receiver circuit descriptions 1140 include circuit descriptions for a receiver interface 1142, comparators 1144, samplers 1146, and a decoder 1148. Alternately, the receiver circuit descriptions 1140 stored in the computer readable storage medium may include descriptions of a subset of the aforementioned circuits, and may optionally include descriptions of additional circuits.

Devices and circuits described herein can be implemented using computer aided design tools available in the art, and embodied by computer readable files containing software descriptions of such circuits, at behavioral, register transfer, logic component, transistor and layout geometry level descriptions stored on storage media or communicated by carrier waves. Data formats in which such descriptions can be implemented include, but are not limited to, formats supporting behavioral languages like C, formats supporting register transfer level RTL languages like Verilog and VHDL, and formats supporting geometry description languages like GDSII, GDSIII, GDSIV, CIF, MEBES and other suitable formats and languages. Data transfers of such files on machine readable media can be performed electronically over the diverse media on the Internet or through email, for example. Physical files can be implemented on any machine readable storage media currently available or that may become available in the future.

The foregoing descriptions of specific embodiments of the present embodiments are presented for purposes of illustration and description. They are not intended to be exhaustive or to limit the disclosure to the precise forms disclosed. Rather, it should be appreciated that many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

What is claimed is:

1. A method of communicating data in an analog multi-tone system having N active sub-channels, the method comprising:
   receiving a data transmission signal containing N active sub-channel signals and N symbols;
   comparing the received signal, in parallel, with each of a plurality of distinct threshold levels to produce a corresponding plurality of comparison signals;
   sampling, during each time interval of a sequence of time intervals, each of the plurality of comparison signals to produce a plurality of data sets; and
   decoding the plurality of data sets to determine the N symbols, based on a priori knowledge of possible transitions of the received signal in the analog multi-tone system.

2. The method of claim 1, wherein the plurality of threshold levels includes at least one threshold level based on a magnitude of at least one of the sub-channel signals.

3. The method of claim 1, further comprising decoding the plurality of data sets to determine the N symbols based on a response of a communication channel over which the data transmission signal is received.

4. The method of claim 1, wherein N is equal to two, further comprising:
   comparing the received signal with a first threshold level of the plurality of distinct threshold levels to produce a first comparison signal of the plurality of comparison signals, the first threshold level equal to a maximum magnitude of the sub-channel signals; and
   in parallel, comparing the received signal with a second threshold level of the plurality of distinct threshold levels to produce a second comparison signal of the plurality of comparison signals, the second threshold level equal to a minimum magnitude of the sub-channel signals.

5. The method of claim 1, wherein N is equal to four, further comprising:
   comparing the received signal with a first threshold level of the plurality of distinct threshold levels to produce a first comparison signal of the plurality of comparison signals, the first threshold level equal to a maximum magnitude of the received signal less a maximum magnitude of the sub-channel signals;
   in parallel, comparing the received signal with a second threshold level of the plurality of distinct threshold levels to produce a second comparison signal of the plurality of comparison signals, the second threshold level equal to zero; and
   in parallel, comparing the received signal with a third threshold level of the plurality of distinct threshold levels to produce a third comparison signal of the plurality of comparison signals, the third threshold level equal to a minimum magnitude of the received signal added to a maximum magnitude of the sub-channel signals.

6. The method of claim 1, wherein the plurality of comparison signals are voltage signals.

7. The method of claim 1, further comprising:
   sampling each of the plurality of comparison signals at a sampling rate corresponding to a total data rate of the received signal.

8. The method of claim 1, further comprising:
   sampling each of the plurality of comparison signals at a sampling rate greater than a total data rate of the received signal.

9. The method of claim 1, wherein the decoder decodes at a rate equal to a symbol rate per sub-channel.

10. A data receiver circuit, for use in an analog multi-tone system, the data receiver circuit comprising:
    an interface to receive a data transmission signal having N active sub-channel signals and N symbols;
    a plurality of samplers to sample, during each time interval of a sequence of time intervals, the received signal in parallel to produce a plurality of data sets, each sampler having a threshold level; and a decoder to decode the plurality of data sets to determine the N symbols, based on a priori knowledge of possible transitions of the received signal in the analog multi-tone system.

11. The circuit of claim 10, wherein at least one threshold level of the plurality of distinct threshold levels is based on a magnitude of at least one of the sub-channel signals.

12. The circuit of claim 10, wherein the decoder decodes the plurality of data sets to determine the N symbols based on a response of a communication channel over which the data transmission signal is received.

13. The circuit of claim 10, wherein the plurality of samplers sample the received signal at a sampling rate corresponding to a total data rate of the received signal.

14. The circuit of claim 10, wherein the plurality of samplers sample the received signal at a sampling rate greater than a total data rate of the received signal.

15. The circuit of claim 10, further comprising:

a plurality of comparators, each comparator to compare the received signal with a respective sampler's threshold level to produce a comparison signal.

16. The circuit of claim 15, wherein N is equal to two, further comprising:

a first comparator of the plurality of comparators to compare the received signal with a first threshold level to produce a first comparison signal, the first threshold level equal to a maximum magnitude of the sub-channel signals; and a second comparator of the plurality of comparators to compare, in parallel with the first comparator, the received signal with a second threshold level to produce a second comparison signal, the second threshold level equal to a minimum magnitude of the sub-channel signals.

17. The circuit of claim 15, wherein N is equal to four, further comprising:

a first comparator of the plurality of comparators to compare the received signal with a first threshold level to produce a first comparison signal, the first threshold level equal to a maximum magnitude of the received signal less a maximum magnitude of the sub-channel signals;

a second comparator of the plurality of comparators to compare, in parallel, the received signal with a second threshold level to produce a second comparison signal, the second threshold level equal to zero; and a third comparator of the plurality of comparators to compare, in parallel, the received signal with a third threshold level to produce a third comparison signal, the third threshold level equal to a minimum magnitude of the received signal added to a maximum magnitude of the sub-channel signals.

18. The circuit of claim 15, wherein the plurality of comparison signals are voltage signals.

19. The circuit of claim 10, wherein the samplers are single-bit samplers.

20. A signaling system comprising:

a signaling link;

a first integrated circuit coupled to the signaling link and having a first transmitter to transmit, via the signaling link, a first data transmission signal containing N active sub-channel signals corresponding to N active sub-channels of the signaling link, and a first receiver, the first receiver including:

an interface, coupled to the signaling link, to receive a second data transmission signal containing N sub-channel signals corresponding to N active sub-channels of the signaling link;

a plurality of samplers to sample, during each time interval of a first sequence of time intervals, the received second data transmission signal in parallel to produce a first plurality of data sets, each sampler having a distinct respective threshold level; and a decoder to decode the first plurality of data sets to determine N data symbols; and a second integrated circuit coupled to the signaling link and having a second transmitter to transmit, via the signaling link, the second data signal and a second receiver to receive the first data transmission signal from the signaling link; the second receiving including:

an interface, coupled to the signaling link, to receive the first data transmission signal;

a plurality of samplers to sample, during each time interval of a second sequence of time intervals, the received first data transmission signal in parallel to produce a second plurality of data sets, each sampler having a distinct respective threshold level; and a decoder to decode the second plurality of data sets to determine N data symbols.

21. The method of claim 1, wherein the N active sub-channel signals comprise orthogonal signals.

22. The circuit of claim 10, wherein the N active sub-channel signals comprise orthogonal signals.

* * * * *